United States Patent [19]
Iwaki et al.

[11] Patent Number: 5,668,746
[45] Date of Patent: Sep. 16, 1997

[54] REPRODUCED WAVEFORM EQUALIZATION CIRCUIT

[75] Inventors: Tetsuo Iwaki, Yamatokoriyama; Toshiaki Harada, Tenri; Chiaki Yamawaki, Habikino, all of Japan

[73] Assignee: Sharp Kabushiki Kaisha, Osaka, Japan

[21] Appl. No.: 364,187

[22] Filed: Dec. 27, 1994

[30] Foreign Application Priority Data

Dec. 27, 1993 [JP] Japan ................................ 5-330448

[51] Int. Cl.$^6$ ............................ G06F 17/10; G11B 5/00; G11B 5/07; G11B 5/035
[52] U.S. Cl. ............................. 364/724.14; 364/724.16; 360/32; 360/65
[58] Field of Search ...................... 364/724.01, 724.1, 364/724.14, 724.16, 724.17, 724.19, 724.2, 718; 360/32, 65

[56] References Cited

U.S. PATENT DOCUMENTS

| | | | |
|---|---|---|---|
| 4,472,785 | 9/1984 | Kasuga | 364/718 |
| 4,590,524 | 5/1986 | Okamoto et al. | 360/65 |
| 4,847,864 | 7/1989 | Cupo | 364/724.2 |
| 4,939,516 | 7/1990 | Early | 341/143 |
| 5,005,184 | 4/1991 | Amano et al. | 375/232 |
| 5,245,343 | 9/1993 | Greenwood et al. | 341/143 |
| 5,440,434 | 8/1995 | Kanegae | 360/65 |

FOREIGN PATENT DOCUMENTS

| | | |
|---|---|---|
| 0 516 216 A2 | 12/1992 | European Pat. Off. . |
| 0 535 737 A2 | 4/1993 | European Pat. Off. . |
| 0 615 229 A2 | 9/1994 | European Pat. Off. . |
| 4-233816(A) | 8/1992 | Japan . |

OTHER PUBLICATIONS

Dr. Shigeo TSUJII, "Basic Digital Signal Processing" (Abstract), *The Institute of Electronics, Information and Communication Engineers*, 5th ed. publ. Apr. 25, 1993, pp. 50–56.

G. Lokhoff et al. "New Developments for The Digital Compact Cassette System", *IEEE Transaction on Consumer Electronics*, vol. 39, No. 3, Aug. 1993, pp. 350–355.

IBM Corp., 1993, IBM Technical Disclosure Bulletin, Jun. 1992, US vol. 35, No. 1A, Digital Filter With Fast Response Time and Frequency Selective Coefficients, pp. 464–467.

Patent Abstracts of Japan, vol. 6, No. 144 (E–122), Aug. 1982.

Patent Abstracts of Japan, vol. 6, No. 160 (E–160), Aug. 1982.

Patent Abstracts of Japan, vol. 11, No. 117 (E–498), Apr. 1987.

Primary Examiner—Roy N. Envall, Jr.
Assistant Examiner—Emmanuel L. Moise
Attorney, Agent, or Firm—Dike, Bronstein, Roberts & Cushman LLP

[57] ABSTRACT

Low-frequency components of a reproduced modulated signal is attenuated by an analog high-pass filter. The modulated signal with its low-frequency components attenuated is converted into a digital signal by means of an A/D converter. Then, the digital signal is directly introduced to a finite impulse response digital filter to be subjected to reproduced waveform equalization. Thereafter, the attenuation of the low-frequency components effected by the analog high-pass filter is compensated in an infinite impulse response digital filter.

2 Claims, 10 Drawing Sheets

REPRODUCED WAVEFORM EQUALIZATION CIRCUIT

BACKGROUND OF THE INVENTION

(1) Field of the Invention

The present invention relates to a magnetic reproducing apparatus for reproducing a digital signal from a magnetic recording medium in which digital signals are modulated and recorded as modulated digital signals, and more detailedly relates to a reproduced waveform equalization circuit which processes modulated digital signals detected by a reproducing head.

(2) Description of the Prior Art

In a digital magnetic recording device such as a digital compact cassette (to be referred to hereinafter as DCC) device etc., digital signals are modulated to produce modulated signals, which in turn are recorded on a magnetic recording medium. When the modulated data is detected from modulated signals upon reproducing, a correction called reproduced waveform equalization is performed so that the transfer function for the recording/reproducing process may have Nyquist characteristics in order to inhibit interference between codes. This correction can be done by using either an analog filter or a digital filter. FIG. 1 shows a prior art configuration in which the reproduced waveform equalization is performed by a digital filter.

In the figure, a head amplifier 1 amplifies the modulated signal from a reproducing head to a preset level. A low-pass filter (to be referred to hereinafter as an LPF) 3 is used to attenuate high-frequency components beyond required ranges in order to remove aliasing noise generating in sampling at an A/D converter 64a. The output from the A/D converter 64a is introduced to a finite impulse response digital filter (to be referred to hereinafter as an FIR filter) 66. This FIR filter 66 is also called as a transversal filter and performs equalization in digital mode. The output from the FIR filter 66 is introduced to a data detector in which predetermined modulated data is produced.

FIG. 2 shows an improved configuration of the prior art configuration shown in FIG. 1. In this configuration, a high-pass filter (to be referred to hereinafter as an HPF) 2 attenuating low-frequency components of the reproduced modulated signal is interposed between the head amplifier 1 and the LPF 3. Further, an infinite impulse response digital filter (to be referred to as an IIR) 65 compensating the attenuation of the low-frequency components due to the HPF 2 is interposed between the A/D converter 64b and the FIR filter 66.

Advantages in the above configuration will be described hereinbelow.

In general, a modulated signal is composed of several kinds of frequencies, although the number of frequencies depends on its modulating mode. For example, in a case of the 8/10 modulating mode which has been used for the recent DCC devices, the maximum cyclic frequency is 48 kHz (to be referred to hereinbelow as fmax) while the minimum cyclic frequency is 9.6 kHz (to be referred to hereinbelow as fmin). As to the reproduced modulated signal, although the levels of the reproduced signal at the frequencies of fmax and fmin depend upon electromagnetic characteristics such as frequency characteristics of a reproducing head used, the reproduced signal level at fmin is typically greater than that at fmax. In the case of DCCs, this level difference is greater than some 20 dB.

In this case, as regards the S/N ratio of the signal A/D converted by the A/D converter, the level of the signal component S in the S/N ratio will be determined by the reproduced signal level at fmax while the level of the noise component N in the S/N ratio will be determined by noises due to the quantization by the A/D converter. This quantization noise is determined by the dynamic range which can be determined by the number of bits for quantization in the A/D converter and the aforementioned reproduced signal level at fmin.

Based on the above description, a comparison will be made between the prior art configurations shown FIG. 1 and FIG. 2 in view of the number of bits in the A/D converters 64a and 64b.

For instance, suppose that a reproduced signal having levels at fmax and at fmin as shown in FIG. 3 is to be obtained as the output from the head amplifier 1 shown in FIG. 1. A cut-off frequency of the LPF 3 is set up so high as compared to fmax as not to affect both reproduced signal level at fmax and fmin. Since the reproduced signal levels at fmax and fmin will not change in their level after being processed through the LPF 3, the reproduced signal in the A/D converter 64a in the configuration of FIG. 1, has a dynamic range of 'm' dB or the difference between the quantization noise level and the reproduced signal level at fmin. Therefore, the converter 64a has to have a corresponding number of bits for quantization which is able to represent the dynamic range of 'm' dB.

As a general property of A/D converters, when a dynamic range is represented by 'm' (dB) and a number of bits for quantization is represented by 'k', there holds a relation $m = 6 \times k$. Accordingly, the aforementioned A/D converter 64a requires m/6 bits.

On the other hand, in the configuration shown in FIG. 2, the reproduced signal level at fmin is reduced after passing through the HPF 2 by the inhibiting effect of low-frequency components due to the HPF2. At that time, if the attenuating amount of the reproduced signal level is 'h' dB, the dynamic range required for the A/D converter 64b is (m–h)dB and therefore the required number of the bits for quantization for the A/D converter 64b is (m–h)/6.

Now, suppose the DCC device operates in the 8/10 modulating mode and the HPF 2 presents an attenuation characteristic of –6 dB/oct., the aforementioned value 'h' dB can be calculated as about 14 dB. As a result, it is possible to decrease the number of bits in the A/D converter 64b by 2.3 bits as compared to that in the A/D converter 64a.

In the prior art shown in FIG. 2, the provision of the HPF2 narrows the dynamic range to be required for the A/D converter, whereby the number of the bits for quantization required for the A/D converter 64b are decreased. Nevertheless, as the output from the A/D converter 64b is directly introduced to the IIR filter 65 for compensating the reduction in the low-frequency component, the low-frequency range is emphasized in this IIR filter 65 so that the reproduced signal level at fmin is increased by 'h' dB. Accordingly, the output increased in its dynamic range by the IIR filter 65 is input to the FIR filter 66, so that the number of input bits to FIR filter 66 becomes large. This disadvantageously requires a large-scaled circuit configuration for the FIR filter 66.

SUMMARY OF THE INVENTION

The present invention has been devised to solve the above problems, and it is therefore an object of the present invention to provide a reproduced waveform equalization circuit capable of scaling down the circuit configuration of an FIR filter by reducing the number of input bits of the FIR filter.

Further, with regard to constructing an IIR filter, when multipliers are used as means of multiplying coefficients, the number of gates used increases, bringing about disadvantages with respect to the circuit scale and power consumption. In the present invention, an IIR filter is constructed of shifters, adders and subtracters in place of using multipliers, whereby the circuit scale of the IIR filter is cut down.

In order to achieve the above objects, a reproduced waveform equalization circuit of the present invention used in a magnetic reproducing apparatus for reproducing a digital signal from a magnetic recording medium in which digital signals are modulated and recorded as modulated digital signals, comprises: an analog high-pass filter attenuating low-frequency components of the reproduced modulated signal; an A/D converter converting the output from the analog high-pass filter into a digital signal stream; a finite impulse response digital filter performing reproduced waveform equalization of the digital signal converted by the A/D converter; and an infinite impulse response digital filter receiving the output from the finite impulse response digital filter and compensating the attenuation of the low-frequency components due to the analog high-pass filter.

That is, by the configuration described above, the process of the digital signal in the finite impulse response digital filter can be performed using the digital signal which has been converted by the A/D converter and compressed in its dynamic range, so that it is possible to scale down the finite impulse response digital filter.

Further, the infinite impulse response digital filter is constructed of: a first shifter multiplying the input digital signal by $\frac{1}{2}^l$ (l: an integer); a coefficient multiplying circuit composed of either a second shifter multiplying the output from the first shifter by $\frac{1}{2}^m$ (m: an integer) and a first shift register providing a preset delay to the output from the second shifter, or a first shift register providing a preset delay to the output from the first shifter and a second shifter multiplying the output from the first shift register by $\frac{1}{2}^m$ (m: an integer); a first subtracter receiving the output from the first shifter at its addition input and receiving the output from the coefficient multiplying circuit at its subtraction input; a first adder receiving the output from the first subtracter at one of input terminals thereof; a second shift register providing a preset delay to the output from the first adder; a third shifter multiplying the output from the second shift register by $\frac{1}{2}^n$ (n: an integer); a second subtracter receiving the output from the second shift register at its addition input and receiving the output from the third shifter at its subtraction input to provide an output to the other input to the first adder; a fourth shifter multiplying the output from the second shift register by $\frac{1}{2}^p$ (p: an integer); a second adder receiving the output from the fourth shifter at one of input terminals thereof; a third shift register providing a preset delay to the output from the second adder; a fifth shifter multiplying the output from the third shift register by $\frac{1}{2}^q$ (q: an integer); a third subtracter receiving the output from the third shift register at its addition input and receiving the output from the fifth shifter at its subtraction input to provide an output to the other input to the second adder; a fourth subtracter receiving the output from the second adder at its addition input and receiving the output from the third shift register at its subtraction input; and a sixth shifter multiplying the output from the fourth subtracter by $\frac{1}{2}^r$ (r: an integer).

The configuration stated above allows the infinite impulse response filter to be constructed of shifters, adders and subtracters, in place of using multipliers which would increase the number of gates and require a more complicated construction. Accordingly, it is possible to reduce the number of gates used in the infinite impulse response filter.

When the modulated signal at the input of the analog high-pass filter has a dynamic range of 'm' dB and the analog high-pass filter attenuates the modulated signal by 'h' dB at a minimum cyclic frequency (fmin) of the modulated signal, the modulated signal appearing from the output from the analog high-pass filter will have a dynamic range of (m–h)dB. Therefore, the bits for quantization required for the A/D converter converting the output digital signal from the analog high-pass filter reduce in number by h/6 bits as compared to the case where no analog high-pass filter is provided.

Since the finite impulse response digital filter effects reproduced waveform equalization as to the digital signal with reduced bits, the filter can be made as small as to be able to process the signal with h/6 bits deducted. The modulated signal equalized in reproduced wave is introduced to the infinite impulse response digital filter where the signal is intensified in its low frequency range, whereby the signal with the low frequency range inhibited by the analog high-pass filter is restored.

As to the infinite impulse response digital filter, it is possible to effect multiplication of coefficients using shifters for multiplying binary data by $\frac{1}{2}^n$ (n: an integer), adders for adding up binary data, subtracters for effecting subtraction of binary data in place of multipliers which would require an increased number of gates, whereby it is possible to scale down the circuit configuration of the filter. For instance, let us consider a case where multiplication of a coefficient K4 in FIG. 4 is effected by shifters, adders and subtracters alone, without using any multiplier. In this case, the coefficient K4 in FIG. 4 represents the multiplication of an output from a delay element 31 by 0.984375. This function can be effected as shown in FIG. 8 by processing an output from a shift register 51 using a shifter 39 and a subtracter 46. More specifically, in this configuration, the subtracter 46 is adapted to receive the output from the shift register 51 at its addition input and receives at its subtraction input the output from the shifter 39 which multiplies the output from the shift register 51 by 1/64, thus the operation of multiplying the output from the shift register 51 by 63/64 (=0.984375) is realized.

BRIEF DESCRIPTION OF THE DRAWINGS

FIG. 5 is a chart showing coefficients of multipliers used in a prior art infinite impulse response digital filter;

DESCRIPTION OF THE PREFERRED EMBODIMENTS

Now, an embodiment of the present invention will hereinafter be described with reference to the accompanying drawings.

Figure 6:
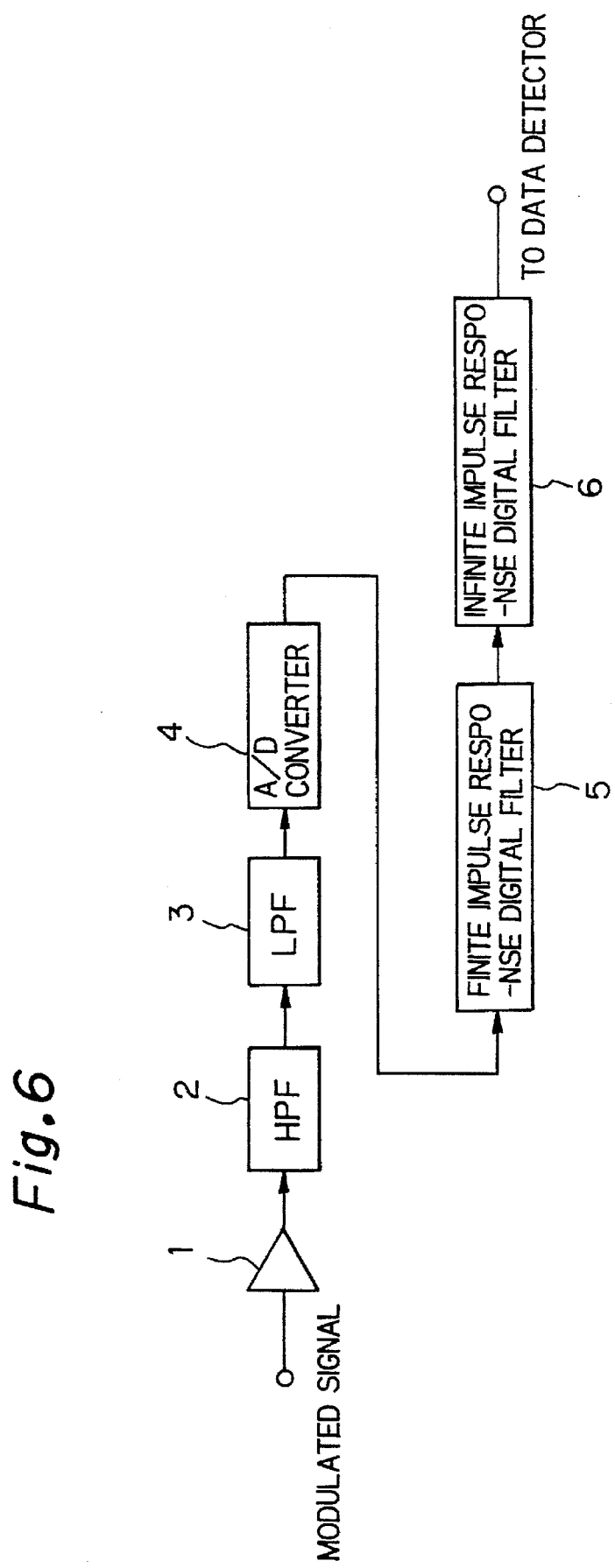
FIG. 6 is a block diagram showing an electric configuration of a reproduced waveform equalization circuit in accordance with an embodiment of the present invention.

FIG. 6 is a block diagram showing an electric configuration of an embodiment of a reproduced waveform equalization circuit of the present invention. In the figure, the blocks having the same configurations with those in the prior art are allotted with identical reference numerals.

In the figure, a head amplifier 1 which receives a modulated signal from an unillustrated reproducing head constitutes a block for amplifying the modulated signal to a predetermined level. The amplified modulated signal is sent out to an analog high-pass filter (to be referred to hereinafter as an HPF) 2.

Figure 3:
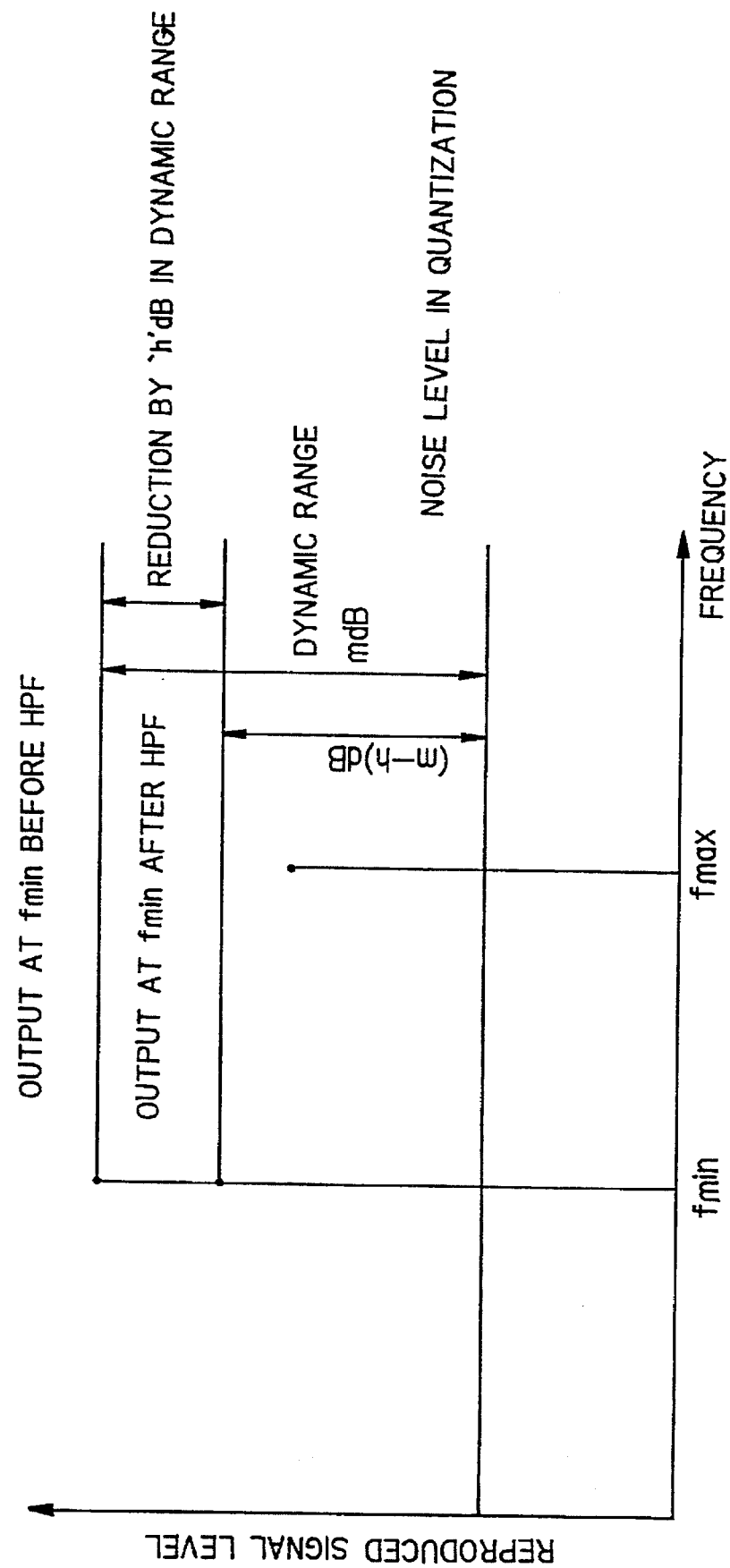
FIG. 3 is an illustrative view showing input/output change in the dynamic range of an analog high-pass filter.

The HPF 2 attenuates the low-frequency components in the modulated signal in order to reduce the number of bits for quantization in an A/D converter 4. Therefore, the output level of the reproduced signal at fmin is reduced by 'h' dB as compared to the input level of the reproduced signal at fmin as shown in FIG. 3. The modulated signal with its low-frequency components thus attenuated is sent out to a low-pass filter (to be referred to hereinafter as an LPF) 3.

The LPF 3 is a filter which reduces high-frequency components other than required ranges to remove aliasing noises arising in sampling in the A/D converter 4. A cut-off off frequency is set up at about a half of the sampling frequencies in the A/D converter 4 so as not to affect the frequency components between fmin and fmax.

The A/D converter 4 receiving the output from the LPF 3 constitutes a block converting an analog signal (the modulated signal in which its low-frequency components are attenuated with unnecessary high-frequency components removed) outputted from the LPF 3 into a digital signal.

The number of bits for the quantization in the A/D conversion is determined by taking into account the attenuation by 'h' dB of the reproduced signal level at fmin of the modulated signal, caused by the analog high-pass filter 2, as well as taking a margin as to the (m−h)dB dynamic range shown in FIG. 3. The thus converted digital signal is sent out to a finite impulse response digital filter 5.

The finite impulse response digital filter 5 is a digital filter which performs reproduced waveform equalization so that the transfer function for the recording/reproducing process may have Nyquist characteristics in order to inhibit interference between codes when the modulated data is detected. The output from the filter 5 is sent out to an infinite impulse response digital filter 6.

The infinite impulse response digital filter 6 is a digital filter which compensates the attenuation of the low-frequency components caused in the analog high-pass filter 2, and increases the reproduced signal level at fmin by 'h' dB. The output from the filter 6 is provided to a data detector for detecting the modulated data.

Figure 7:
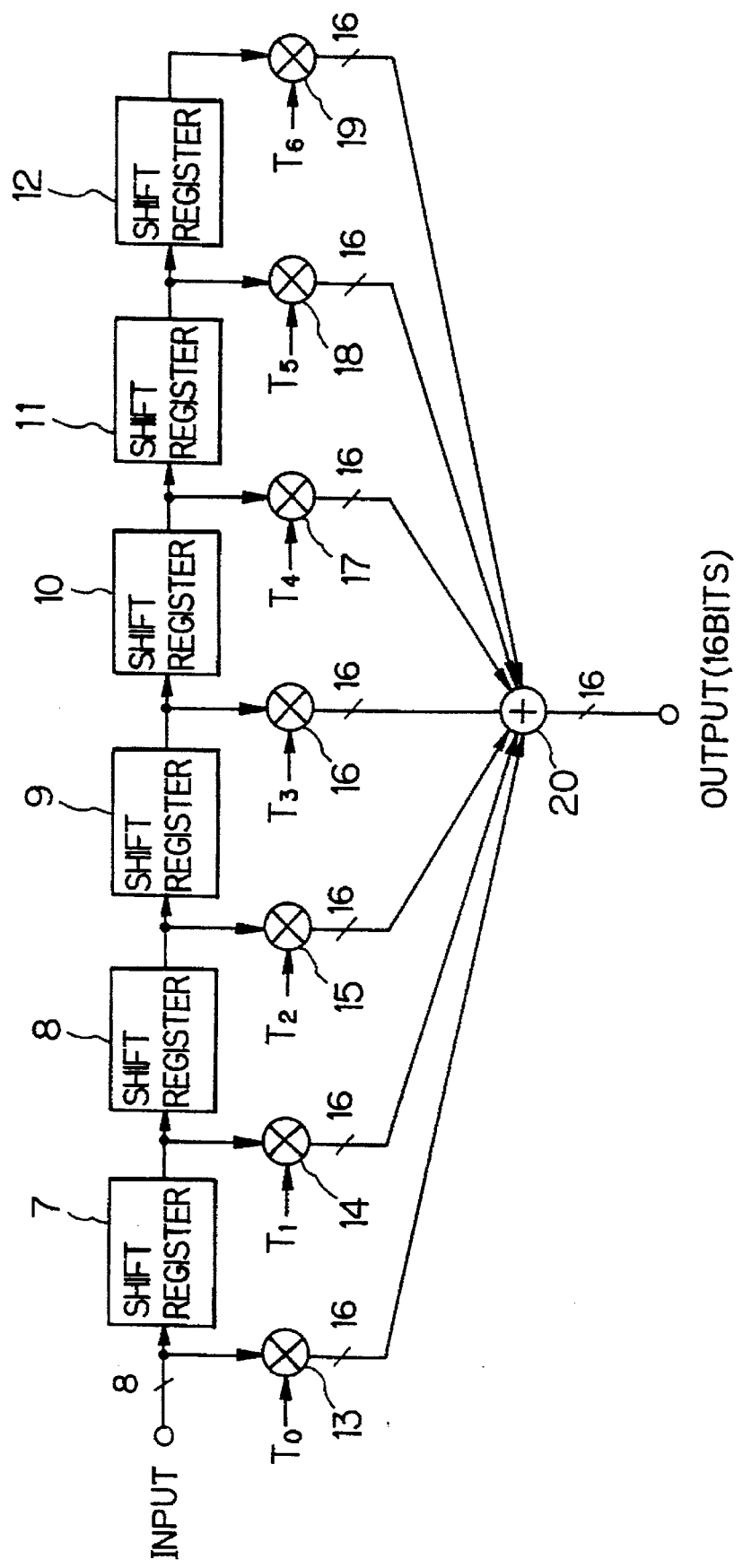
FIG. 7 is a block diagram showing a detailed electric configuration of a finite impulse response digital filter in an embodiment of the present invention.

FIG. 7 is a block diagram showing in detail an electric configuration of the finite impulse response digital filter 5.

The finite impulse response digital filter 5 is a filter formed, in detail, of a digital filter with seven taps and includes six shift registers 7 to 12, connected in series, in order to give preset delays to respective inputs. The output from each tap is introduced to one input terminal of a corresponding multiplier 13 through 19. Each of the multipliers 13 to 19 multiplies the output from the corresponding tap by a corresponding tap coefficient T0 through T6 inputted from the other input terminal to the multiplier. The results of the multiplication are put together into an adding circuit 20 where the results are added up and the sum is sent out to the infinite impulse response digital filter 6.

Here, although the finite impulse response digital filter 5 is formed in combination of shift registers and multipliers as stated above, it is also possible to form the circuit as disclosed in Japanese Patent Application Laid-Open Hei 4 No. 233,816, using shifters, adders and memories each storing a single coefficient, without using any multiplier.

Figure 9:
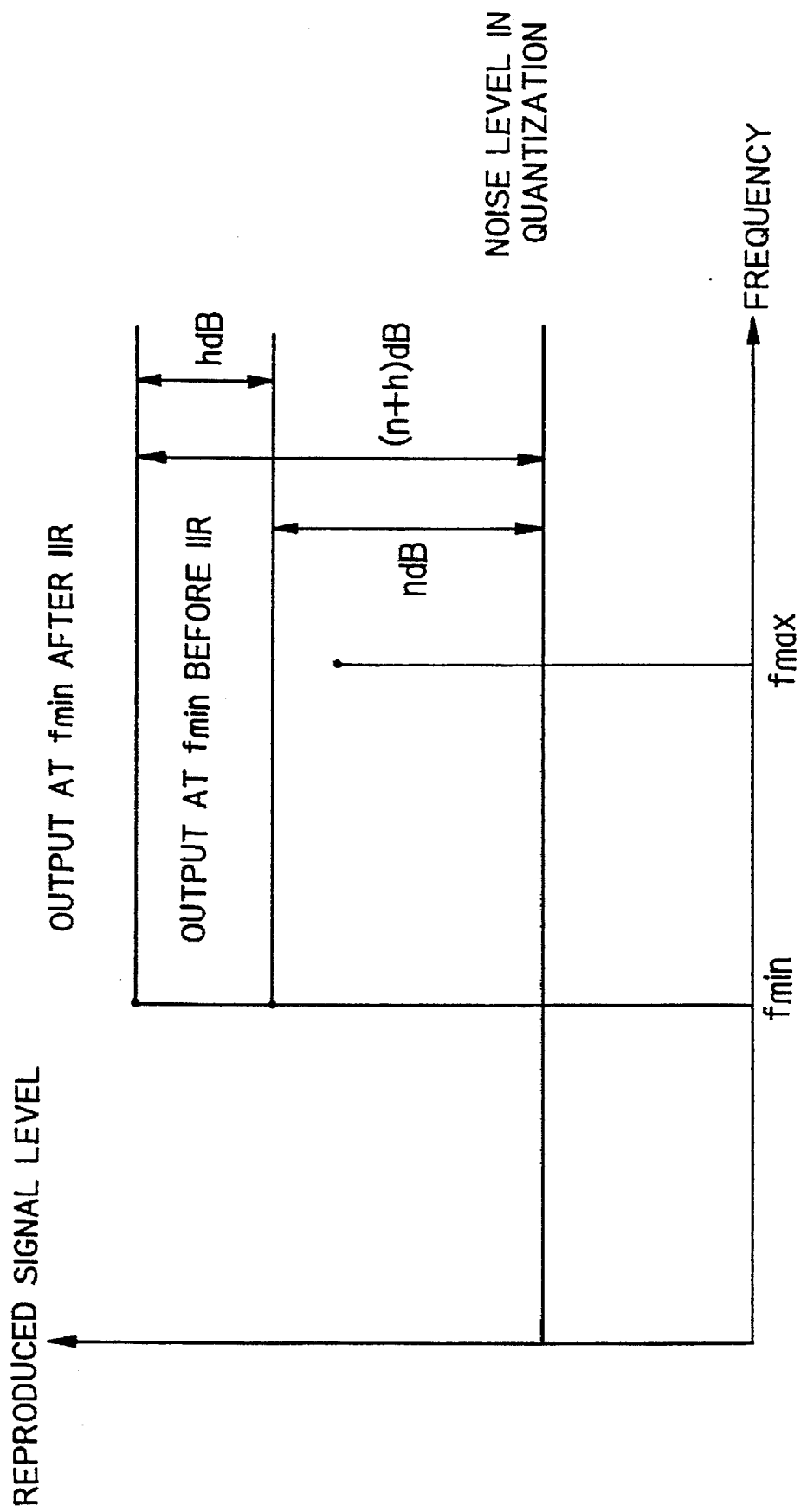
FIG. 9 is an illustrative view showing input/output change in the dynamic range of an infinite impulse response digital filter.

Whichever the finite impulse response digital filter 5 is composed of, either of those stated above, the dynamic range required is equal to that of the digital signal outputted from the A/D converter 4. The dynamic range of the output from the A/D converter 4 is represented by '(m−h)' dB in FIG. 3, which corresponds to 'n' dB shown in FIG. 9. Accordingly, the required number of bits is n/6 (or (m−h)/6 in the.representation of FIG. 3).

Figure 1:
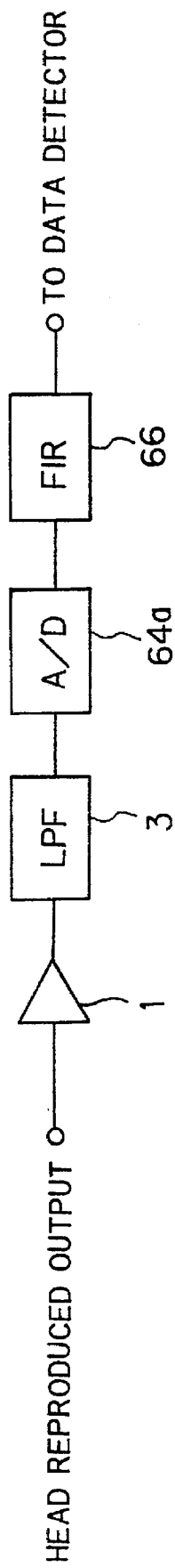
FIG. 1 is a block diagram showing an example of a prior art electric configuration.
Figure 2:
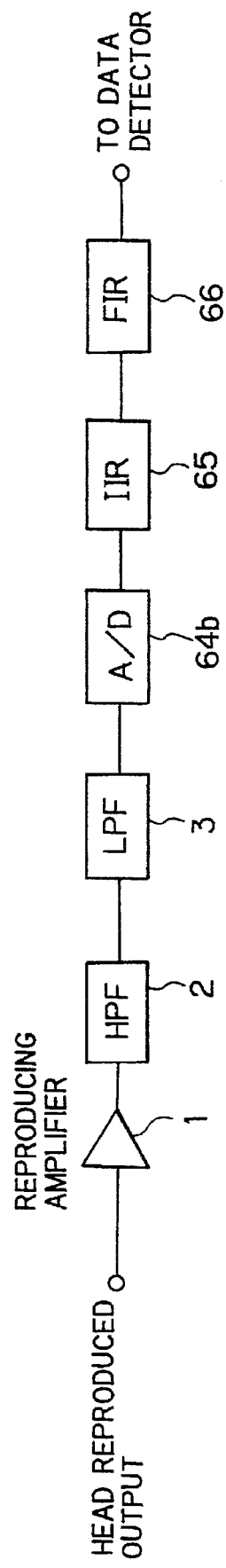
FIG. 2 is a block diagram showing an example of another prior art electric configuration.

Now, the number of bits in the finite impulse digital filter 5 is to be compared with that of the prior art shown in FIG. 2.

The input to be processed by the finite impulse response digital filter 66 in the prior art, has been formed such that the input signal once compressed by the analog high-pass filter 2 with respect to its dynamic range, is recovered so as to have the dynamic range equal to that of the original signal. That is, the input to be processed by the filter 66 has a dynamic range of (n+h)dB and consequently, the filter 66 requires (n+h)/6 bits .

On the other hand, in the present invention, the number of bits required for the finite impulse response digital filter 5 is n/6 (bits), that is, the number of bits in the present invention is smaller by h/6 bits than that in the prior art.

More specifically, if the modulated signal is processed by, for example, a DCC device operating in the 8/10 modulating mode and the analog high-pass filter 2 has an attenuation characteristic of −6 dB/oct., the value 'h' becomes roughly equal to 14 dB. That is, the number of bits in the present invention is reduced by 2.3 bits as compared to that of the prior art.

Figure 4:
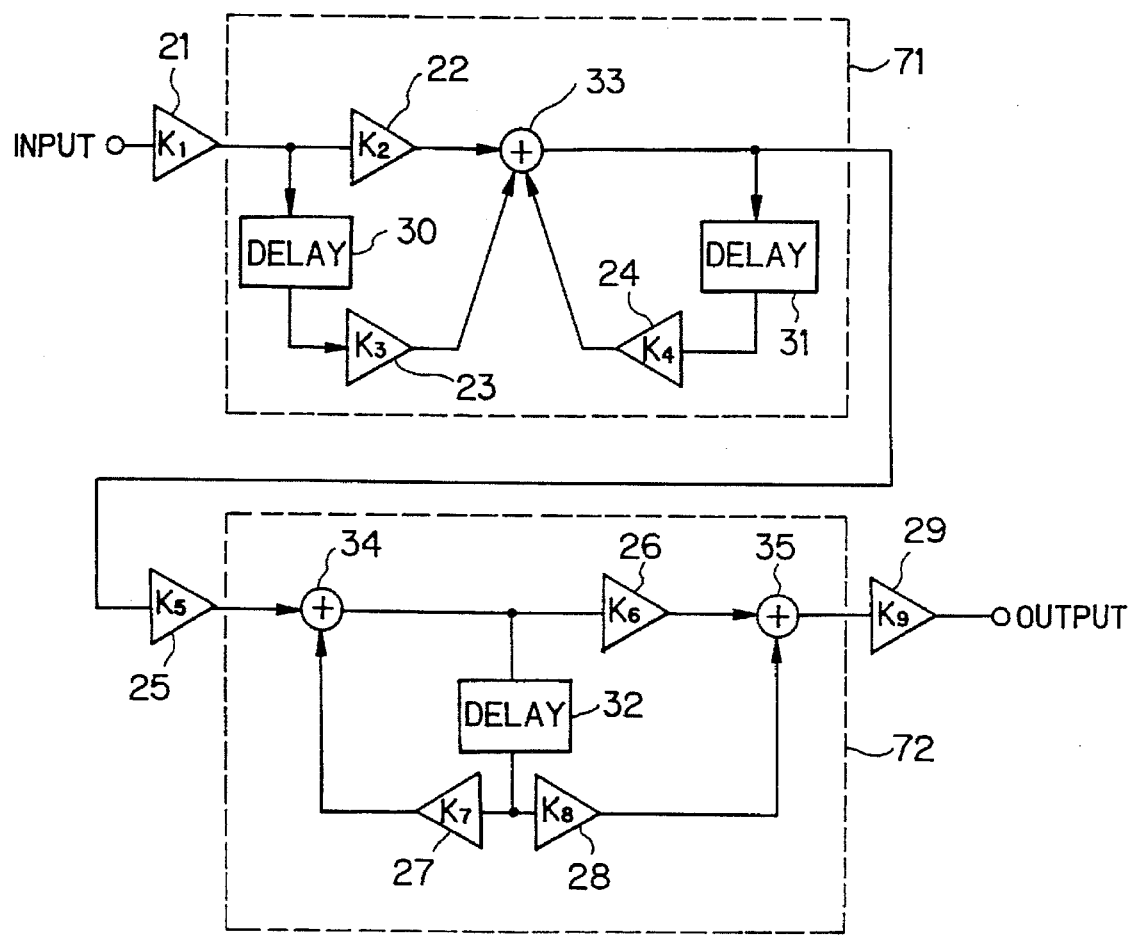
FIG. 4 is a block diagram showing an electric configuration of a prior art infinite impulse response digital filter.

FIG. 4 shows a double-step infinite impulse response filter constructed of infinite impulse response digital filters shown in 'DEJITAL-SHINGOSHORI-NO-KISO (Basic Digital Signal Processing)' on p.53 issued by The Institute of Electronics, Information and Communication Engineers. This digital filter is used to compensate the attenuation of the low-frequency components (the attenuation represented by 'h' dB as to the level of the reproduced signal at fmin) caused in the analog high-pass filter 2.

This infinite impulse response digital filter is composed of a 3D type first-order low-pass infinite impulse response filter 71 and 1D type first-order high-pass infinite impulse response filter 72 and comprises nine multipliers 21 to 29, three delay elements 30 to 32 and three adders 33 to 35.

More detailedly, the filter comprises: a first shifter multiplying the input digital signal by $\frac{1}{2}^l$ (l: an integer); a coefficient multiplying circuit composed of either a second shifter multiplying the output from the first shifter by $\frac{1}{2}^m$ (m: an integer) and a first shift register providing a preset delay to the output from the second shifter, or a first shift register providing a preset delay to the output from the first shifter and a second shifter multiplying the output from the first shift register by $\frac{1}{2}^m$ (m: an integer); a first subtracter receiving the output from the first shifter at its addition input and receiving the output from the coefficient multiplying circuit at its subtraction input; a first adder receiving the output from the first subtracter at one of input terminals thereof; a second shift register providing a preset delay to the output from the first adder; a third shifter multiplying the output from the second shift register by $\frac{1}{2^n}$ (n: an integer); a second subtracter receiving the output from the second shift register at its addition input and receiving the output from the third shifter at its subtraction input to provide an output to the other input to the first adder; a fourth shifter multiplying the output from the second shift register by $\frac{1}{2^p}$ (p: an integer); a second adder receiving the output from the fourth shifter at one of input terminals thereof; a third shift register providing a preset delay to the output from the second adder; a fifth shifter multiplying the output from the third shift register by $\frac{1}{2^q}$ (q: an integer); a third subtracter receiving the output from the third shift register at its addition input and receiving the output from the fifth shifter at its subtraction input to provide an output to the other input to the second adder; a fourth subtracter receiving the output from the second adder at its addition input and receiving the output from the third shift register at its subtraction input; and a sixth shifter multiplying the output from the fourth subtracter by $\frac{1}{2^r}$ (r: an integer).

Figure 8:
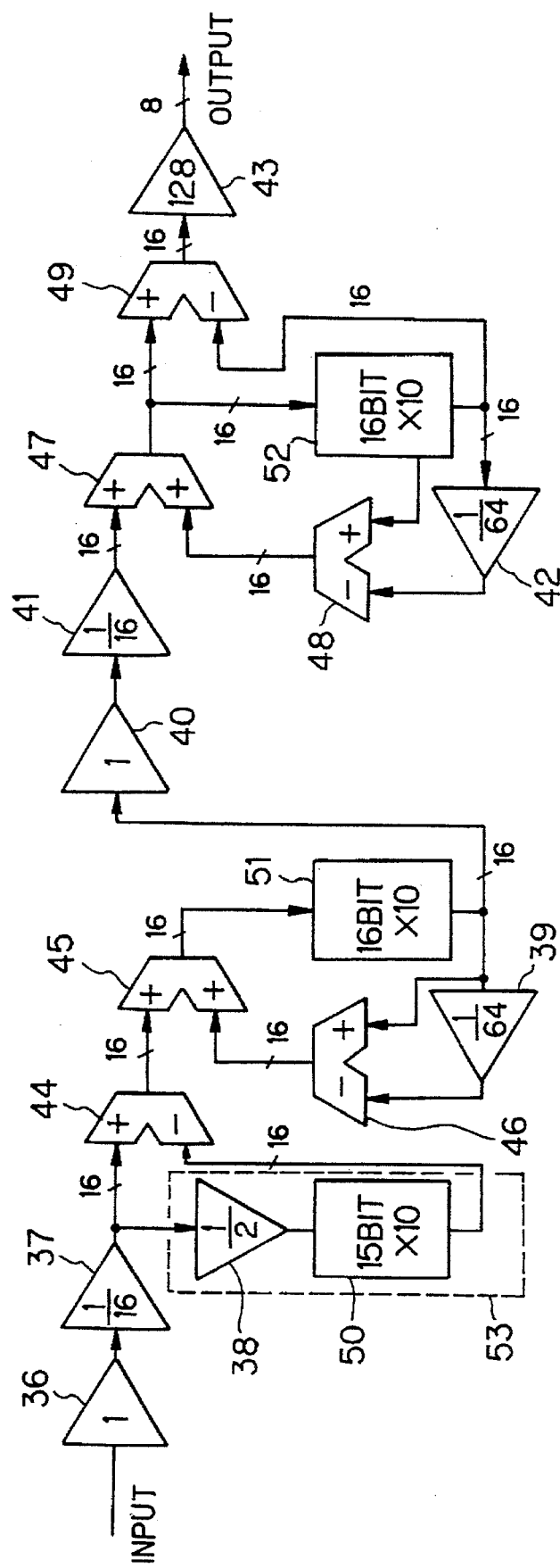
FIG. 8 is a block diagram showing a detailed electric configuration of an infinite impulse response digital filter in an embodiment of the present invention.

FIG. 8 shows an example of the above configuration where l=4, m=1, n=6, p=4, q=6 and r=−7. On the other hand, the nine multipliers 21 to 29 as components of the infinite impulse response digital filter shown in FIG. 4 have respective coefficients K1 through K9 shown in FIG. 5.

On the contrary, the infinite impulse response digital filter 6 used in the embodiment of the present invention does not use any multiplier which would require a more complicated circuit structure, but is constructed of adders, subtracters and shifters. FIG. 8 shows the electric configuration of this embodiment. In the figure, the displays '×10' written on shift registers 50, 51 and 52 represent a multi-track system in which plural tracks are used for time-dividing process and indicate that the configuration of this specific example performs ten track time-division. That is, a system having n-tracks needs 'xn' delays (delays for n channels).

In the figure, in order to adjust an input signal to a predetermined magnitude by internally processing the signal, a shifter 36 for multiplying the input by a constant and a first shifter 37 for multiplying an introduced digital signal by 1/16 are provided to realize a coefficient K1 to be 0.0625 (1/16) shown in FIG. 5.

A coefficient K3 is set up by a block comprising a coefficient multiplying circuit 53 composed of a second shifter 38 multiplying the output from the first shifter 37 by ½ and a first shift register 50 providing a preset delay to the output from the second shifter 38 and a first subtracter 44 receiving the output from the first shifter 37 at its addition input and receiving the output from the coefficient multiplying circuit 53 at its subtraction input.

That is, the coefficient K3=−0.5 is realized by the fact that the output from the first shifter register 50 is introduced to the subtraction input to the subtracter 44 and the second shifter 38 executes multiplication by ½.

A coefficient K4 is set up by a block comprising a first adder 45 receiving the output from the first subtracter 44 at one of input terminals thereof, a second shift register 51 providing a preset delay to the output from the first adder 45, a third shifter 39 multiplying the output from the second shift register 51 by 1/64, a second subtracter 46 receiving the output from the second shift register 51 at its addition input and receiving the output from the third shifter 39 at its subtraction input to provide an output to the other input to the first adder 45.

That is, the coefficient K4=0.984375 (63/64) is realized by the fact that the output from the third shifter 39 in which the output from the second shift register 51 is multiplied by 1/64 is provided to the subtraction input to the second subtracter 46 while the output from the second shift register 51 is provided to the counter-subtraction input (addition input) to the second subtracter 46.

A coefficient K5 is set up to be 0.0625(1/16) by a shifter 40 and a fourth shifter 41 multiplying the output from the second shift register 51.

A coefficient K7 is set up by a block comprising a second adder 47 receiving the output from the fourth shifter 41 at one of input terminals thereof, a third shift register 52 providing a preset delay to the output from the second adder 47, a fifth shifter 42 multiplying the output from the third shift register 52 by 1/64, a third subtracter 48 receiving the output from the third shift register 52 at its addition input and receiving the output from the fifth shifter 42 at its subtraction input to provide an output to the other input to the second adder 47.

That is, the coefficient K7=0.984375 (63/64) is realized by the fact that the output from the fifth shifter 42 in which the output from the third shift register 52 is multiplied by 1/64 is provided to the subtraction input to the third subtracter 48 while the output from the third shift register 52 is provided to the counter-subtraction input (addition input) to the third subtracter 48.

A coefficient K8 is set up by a fourth subtracter 49 receiving the output from the second adder 47 at its addition input and receiving the output from the third shift register 52 at its subtraction input. That is, the coefficient K8=−1.0 is realized by the fact that the output from the third shifter 52 is provided to the subtraction input to the fourth subtracter 49.

A coefficient K9 is set up by a sixth shifter 43 multiplying the output from the fourth subtracter 49 by 128. That is, the coefficient K9 =128 is realized by the fact that the sixth shifter 43 multiplies the input data by 128.

In FIG. 8, no actual circuitry appears for representing coefficients K2 and K6 since the coefficients K2 and K6 are unitary or equal to 1.0.

Here, shifters 36 and 37 are provided to set up a proper input level to the first half part of the infinite impulse response digital filter (including adder 45, subtracter 44, subtracter 46, shift register 50 and shift register 51), in order to prevent an input signal from causing overflow in the first half part as well as to prevent deterioration of the S/N ratio of the modulated signal due to round-off errors arising during the operation in the first half part. Accordingly, it is easily understood analogically that the shifter 36 may be integrated with the shifter 37 or the input level may be set up outside the infinite impulse response digital filter.

Shifters 40 and 41 are provided to set up a proper input level to the latter half part of the infinite impulse response digital filter (including adder 47, subtracter 48, subtracter 49 and shift register 52), in order to prevent an input signal from causing overflow in the latter half part as well as to prevent deterioration of the S/N ratio of the modulated signal due to round-off errors arising during the operation in the latter half part. Accordingly, it is easily understood analogically that the shifter 40 may be integrated with the shifter 41.

A shifter 43 is provided to set up a proper input level to a data detector to be connected after the infinite impulse response digital filter, in order to prevent the output signal from the filter from causing overflow in the data detector as well as to prevent deterioration of the S/N ratio of the modulated signal. Accordingly, it is easily understood analogically that the level control may be performed on the data detector side.

Figure 10:
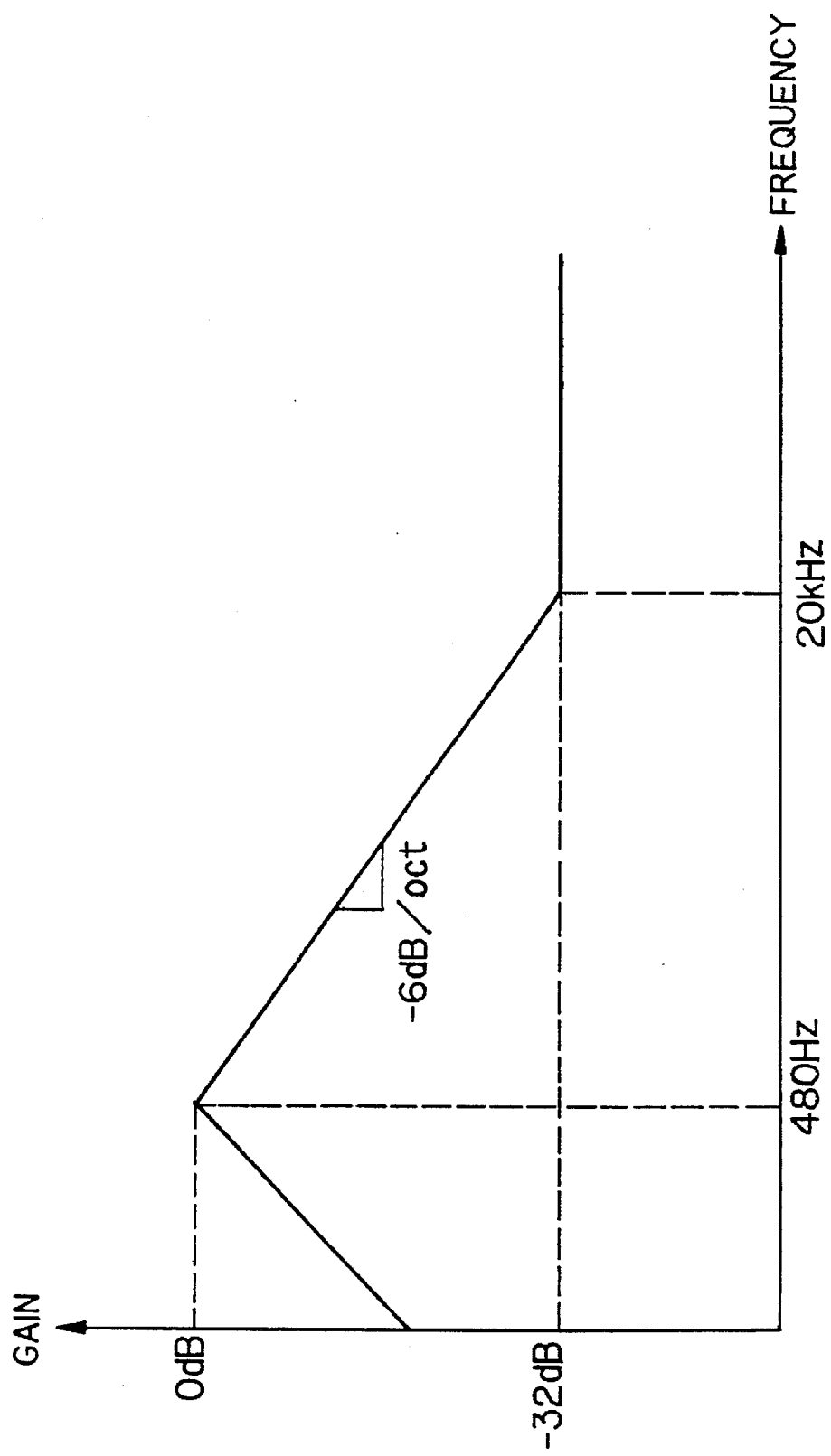
FIG. 10 is an illustrative view showing a frequency characteristic of an infinite impulse response digital filter.

The infinite impulse response digital filter 6 thus constructed presents an attenuation characteristic of −6 dB/oct within a range of from 480 Hz to 20 kHz as shown in FIG. 10. That is, this filter plays a role as a digital filter for compensating an analog high-pass filter 2 having an attenuation characteristic of 6 dB/oct.

The above characteristic is obtained when the delay in the first to third shift registers 50 to 52 corresponding to the delay elements 30 to 32 in FIG. 4 is set up to be 5.2 μsec. A circuit configuration in which the first and latter half parts of the infinite impulse response digital filter shown in the block diagram in FIG. 8 are interchanged each other, can be adapted to have the equivalent frequency characteristic by setting up each of input levels properly.

Now, description will be made of the operation of the embodiment of the present invention thus constructed. In the description, it is assumed that the reproduced waveform equalization circuit of the present invention is applied to a DCC device in which the signal is modulated in the 8/10 modulating mode.

The modulated signal amplified by the head amplifier 1 up to a preset level, is introduced to the analog high-pass filter 2 where the low-frequency components are attenuated. A reduction in this step can be estimated as to be about 14 dB since it is known that the analog high-pass filter 2 has an attenuation characteristic of 6 dB/oct while fmin and fmax are 9.6 kHz and 48 kHz, respectively.

Next, the modulated signal with its low-frequency components attenuated is introduced to the LPF 3 where unnecessary high-frequency components are reduced. Thereafter, the thus processed signal is converted into a digital signal by the A/D converter 4. Since the dynamic range of the digital signal is compressed by about 14 dB, the number of bits required for the digital signal is decreased by two bits as compared to that without its low-frequency components attenuated. This digital signal with two bits deducted is introduced to the finite impulse response digital filter 5.

The finite impulse response digital filter 5 performs a correction of the introduced modulated signal so that the signal may present Nyquist characteristic with respect to the frequency characteristic in order to inhibit interference between codes when the modulated data is detected from the modulated signal.

During this correction, the modulated signal to be processed remains in the form of the digital signal with two bits deducted, since it has been compressed by about 14 dB. The thus corrected modulated signal is transmitted to the infinite impulse response digital filter 6.

The infinite impulse response digital filter 6 receives the signal and emphasizes the signal, particularly the lower-frequency components of the signal, specifically enhancing the signal at fmin or 9.6 kHz by about 14 dB. Accordingly, the signal with its dynamic range compressed in the analog high-pass filter 2 is recovered so as to have the dynamic range equal to that of the original signal. The modulated signal with the thus restored dynamic range is sent out to the data detector where the modulated data is detected.

As has been described, since the infinite impulse response digital filter 6 in this embodiment is constructed of the first to sixth shifters 37 to 39, 41 to 43, the first and second adders 45 and 47 and the first to fourth subtracters 44, 46, 48 and 49 so as to perform multiplication as required for its filtering operation, there is no need to use multipliers which would require a more complicated circuit configuration. As a result, it is possible to scale down the circuit configuration of the infinite impulse response digital filter 6.

The reproduced waveform equalization circuit in accordance with the present invention is designed for a magnetic reproducing apparatus for reproducing a digital signal from a magnetic recording medium in which digital signals are modulated and recorded as modulated digital signals. In this circuit, the reproduced modulated signal is attenuated particularly as to its low-frequency components by the analog high-pass filter. The modulated signal with its low-frequency components attenuated is converted into a digital signal by the A/D converter. The thus converted digital signal is directly introduced to the finite impulse response digital filter where reproduced waveform equalization is performed. Thereafter, the output signal is processed by the infinite impulse response digital filter where the attenuation in the low-frequency components is compensated. That is, the digital signal provided to the finite impulse response digital filter has a form of the modulated signal with its low-frequency components attenuated, therefore the dynamic range of the signal has been compressed and consequently the signal is reduced in the number of bits. For this reason, the signal which the finite impulse response digital filter has to process is reduced in the number of bits, and this contributes to scale-down of the circuit configuration of the finite impulse response digital filter. Further, since the infinite impulse response digital filter is constructed of shifters, adders and subtracters in place of using multipliers which would increase the number of gates and require a more complicated configuration, this makes a contribution to the scale-down of the circuit configuration.

What is claimed is:

1. An infinite impulse response digital filter for use in a reproduced waveform equalization circuit in a magnetic reproducing apparatus for reproducing a digital signal from a magnetic recording medium in which digital signals are modulated and recorded as modulated digital signals, said infinite impulse response digital filter comprising:

a first shifter multiplying an input digital signal by $½^l$ (l: an integer);

a coefficient multiplying circuit composed of either a second shifter multiplying the output from said first shifter by $½^m$ (m: and integer) and a first shift register providing a preset delay to the output from said second shifter, or a first shift register providing a preset delay to the output from said first shifter and a second shifter multiplying the output from said first shift register by $½^m$ (m: an integer);

a first subtracter receiving the output from said first shifter at its addition input and receiving the output from said coefficient multiplying circuit at its subtraction input;

a first adder receiving the output from said first subtracter at one of two input terminals thereof;

a second shift register providing a preset delay to the output from said first adder;

a third shifter multiplying the output from said second shift register by $½^n$ (n: an integer);

a second subtracter receiving the output from said second shift register at its addition input and receiving the output from said third shifter at its subtraction input to provide an output to the other input to said first adder;

a fourth shifter multiplying the output from said second shift register by $½^p$ (p: an integer);

a second adder receiving the output from said fourth shifter at one of two input terminals thereof;

a third shift register providing a preset delay to the output from said second adder;

a fifth shifter multiplying the output from said third shift register by $\frac{1}{2}^q$ (q: an integer);

a third subtracter receiving the output from said third shift register at its addition input and receiving the output from said fifth shifter at its subtraction input to provide an output to the other input to said second adder;

a fourth subtracter receiving the output from said second adder at its addition input and receiving the output from said third shift register at its subtraction input; and a sixth shifter multiplying the output from said fourth subtracter by $\frac{1}{2}^r$ (r: an integer).

2. A reproduced waveform equalization circuit in a magnetic reproducing apparatus for reproducing a digital signal from a magnetic recording medium in which digital signals are modulated and recorded as modulated digital signals, comprising:

an analog high-pass filter attenuating low-frequency components of the reproduced modulated signal;

an A/D converter converting the output from said analog high-pass filter into a digital signal stream;

a finite impulse response digital filter performing reproduced waveform equalization of the digital signal converted by said A/D converter; and an infinite impulse response digital filter receiving the output from said finite impulse response digital filter and compensating the attenuation of the low-frequency components due to said analog high-pass filter, said infinite impulse response digital filter comprising:

a first shifter multiplying the input digital signal by $\frac{1}{2}^l$ (l: an integer);

a coefficient multiplying circuit composed of either a second shifter multiplying the output from said first shifter by $\frac{1}{2}^m$ (m: and integer) and a first shift register providing a preset delay to the output from said second shifter, or a first shift register providing a preset delay to the output from said first shifter and a second shifter multiplying the output from said first shift register by $\frac{1}{2}^m$ (m: an integer);

a first subtracter receiving the output from said first shifter at its addition input and receiving the output from said coefficient multiplying circuit at its subtraction input;

a first adder receiving the output from said first subtracter at one of two input terminals thereof;

a second shift register providing a preset delay to the output from said first adder;

a third shifter multiplying the output from said second shift register by $\frac{1}{2}^n$ (n: an integer);

a second subtracter receiving the output from said second shift register at its addition input and receiving the output from said third shifter at its subtraction input to provide an output to the other input to said first adder;

a fourth shifter multiplying the output from said second shift register by $\frac{1}{2}^p$ (p: an integer);

a second adder receiving the output from said fourth shifter at one of two input terminals thereof;

a third shift register providing a preset delay to the output from said second adder;

a fifth shifter multiplying the output from said third shift register by $\frac{1}{2}^q$ (q: an integer);

a third subtracter receiving the output from said third shift register at its addition input and receiving the output from said fifth shifter at its subtraction input to provide an output to the other input to said second adder;

a fourth subtracter receiving the output from said second adder at its addition input and receiving the output from said third shift register at its subtraction input; and a sixth shifter multiplying the output from said fourth subtracter by $\frac{1}{2}^r$ (r: an integer).

* * * * *